Oct. 22, 1957 W. SELTMANN ET AL 2,810,328
METHOD AND APPARATUS FOR MANUFACTURING PAPER BAGS
Filed Dec. 24, 1954 7 Sheets-Sheet 1
Fig. 1.
Fig. 2.
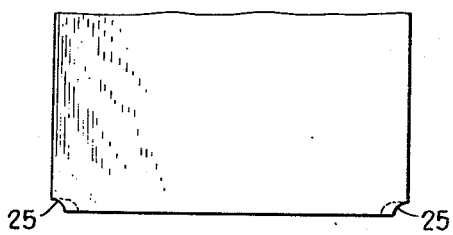
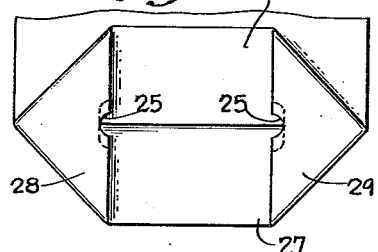
Fig. 3.
Fig. 4.
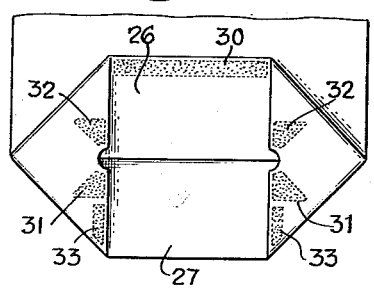
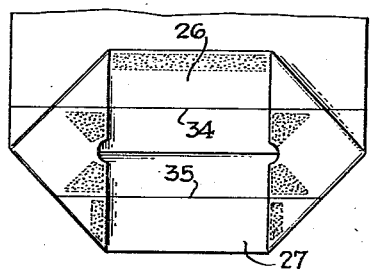
Fig. 5.
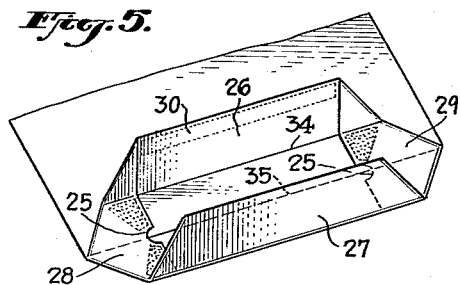
Fig. 6.
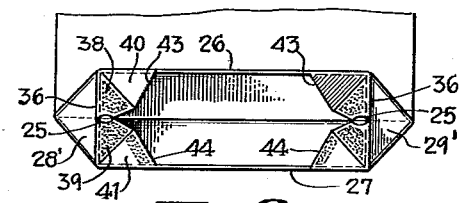
Fig. 8.
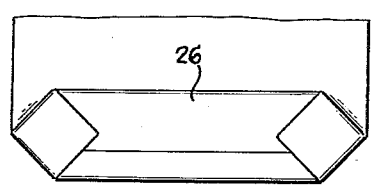
Fig. 7.
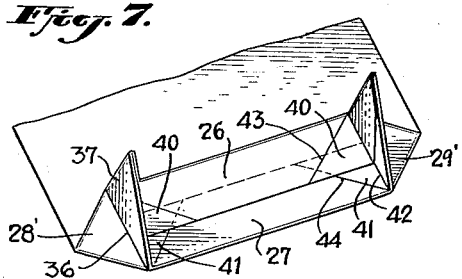
Fig. 10.
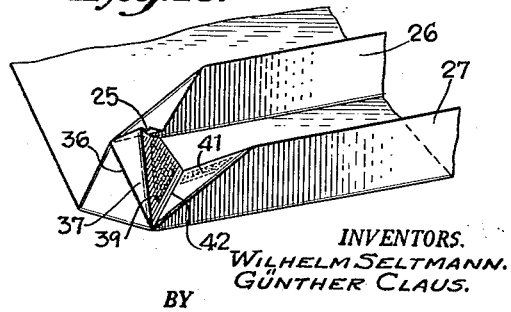
Fig. 9.
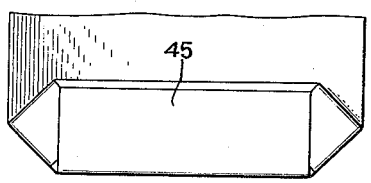
INVENTORS.
WILHELM SELTMANN.
GÜNTHER CLAUS.
BY
Ward, Neal, Haselton, Orme & McElhannon
ATTORNEYS.

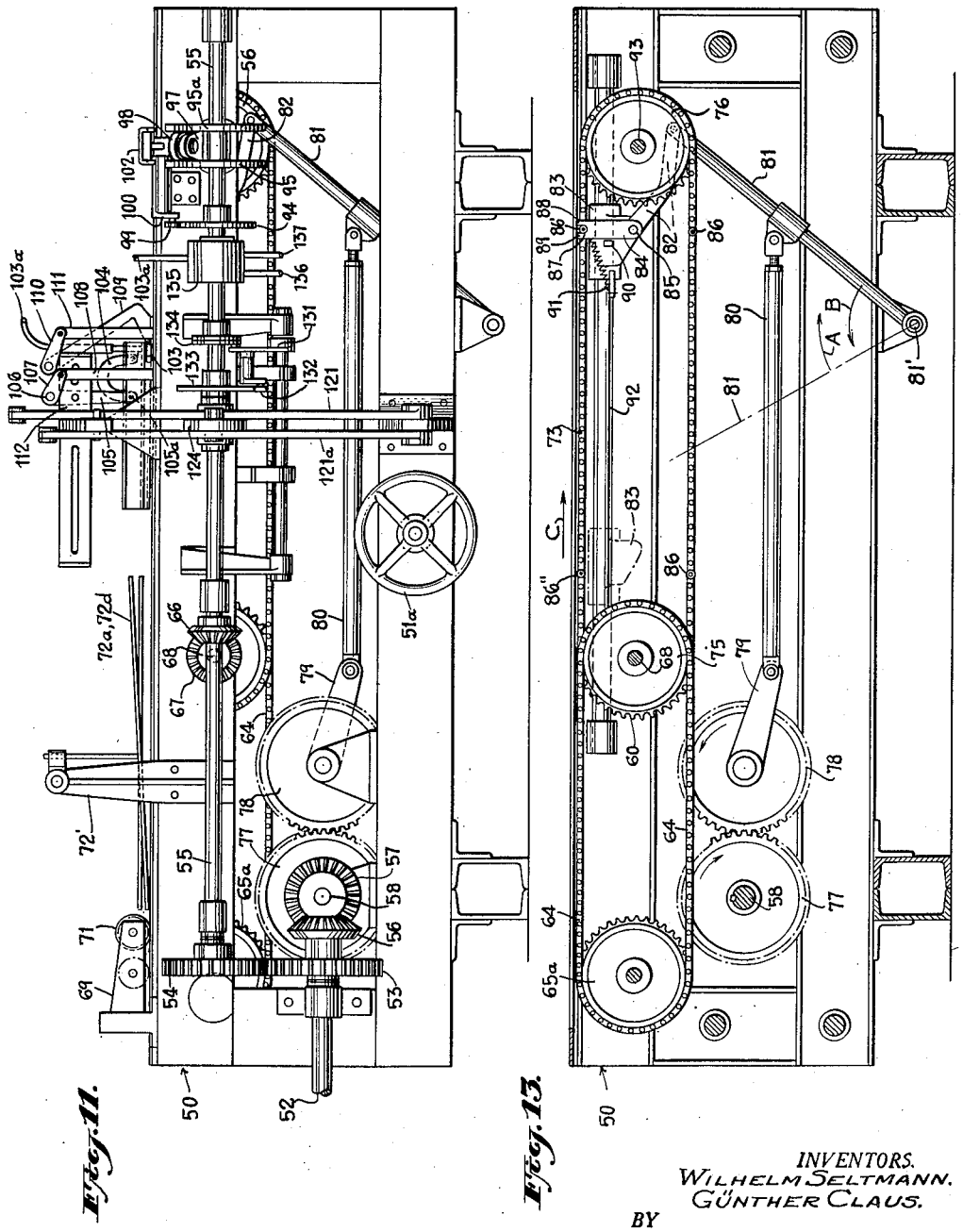

Oct. 22, 1957   W. SELTMANN ET AL   2,810,328
METHOD AND APPARATUS FOR MANUFACTURING PAPER BAGS
Filed Dec. 24, 1954   7 Sheets-Sheet 3

INVENTORS.
WILHELM SELTMANN.
GÜNTHER CLAUS.
BY
Ward, Neal, Haselton, Orme & McElhannon
ATTORNEYS.

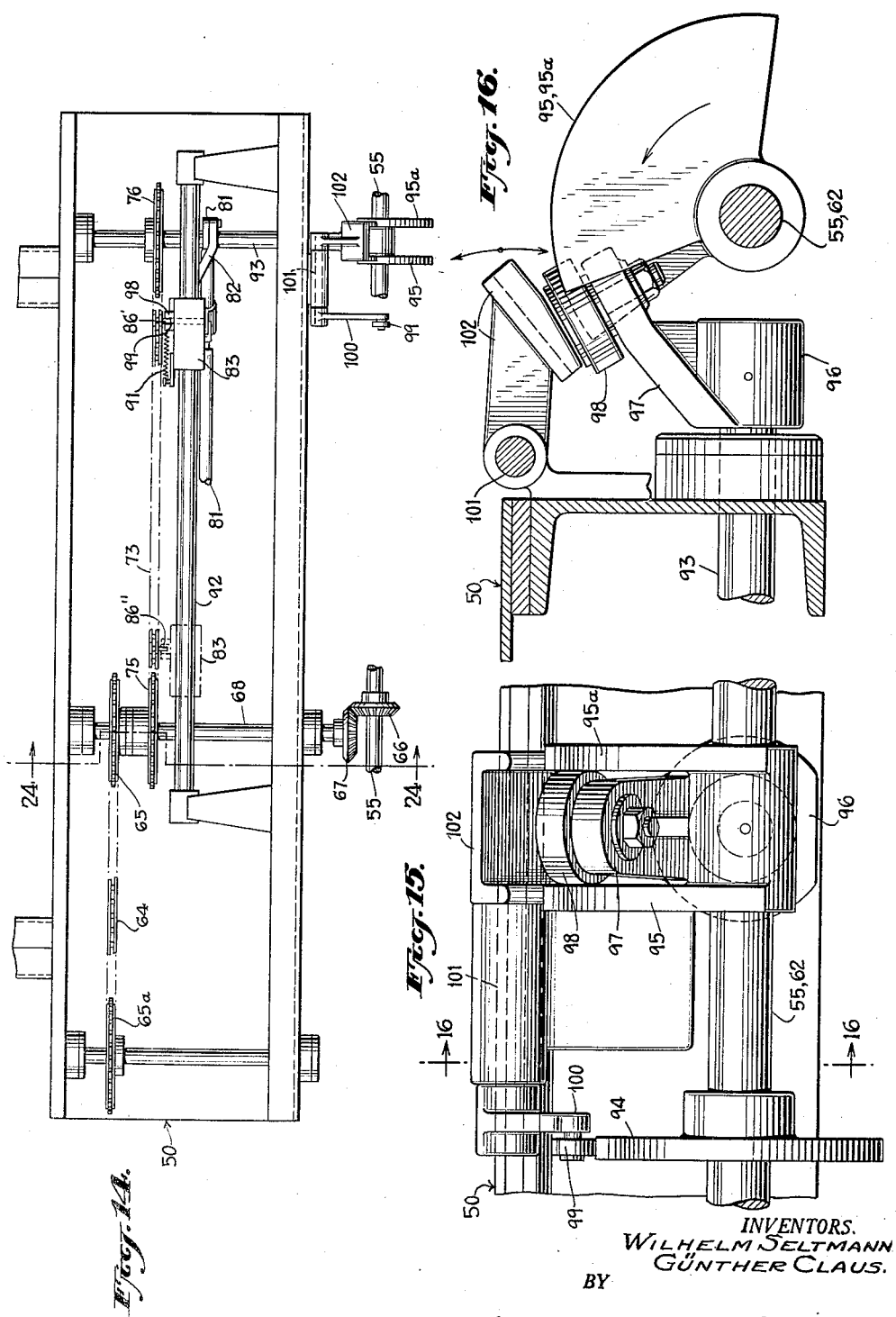

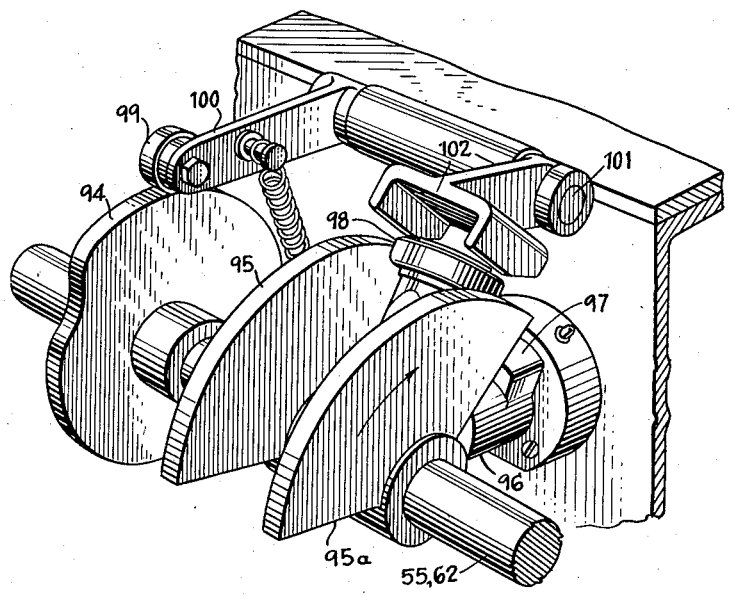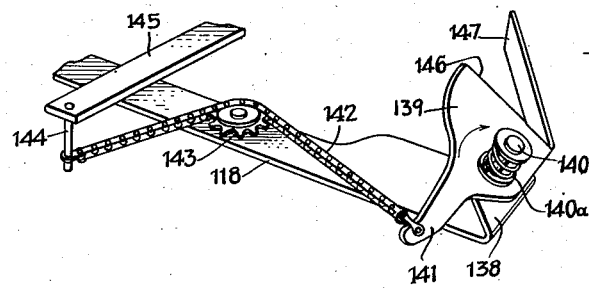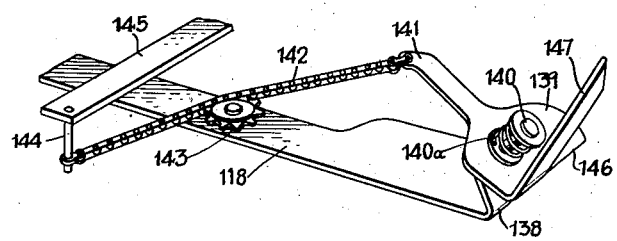

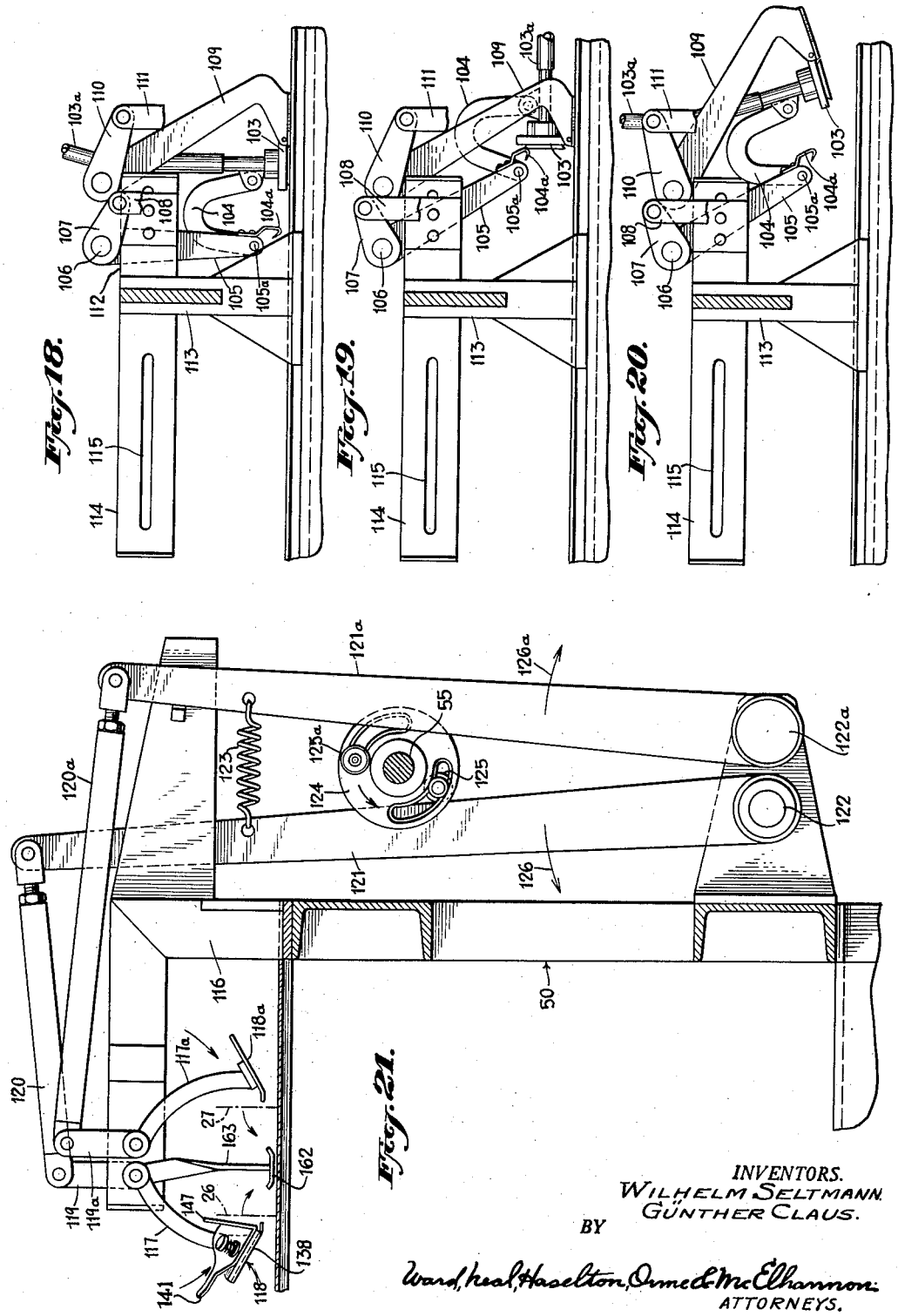

Oct. 22, 1957 W. SELTMANN ET AL 2,810,328
METHOD AND APPARATUS FOR MANUFACTURING PAPER BAGS
Filed Dec. 24, 1954
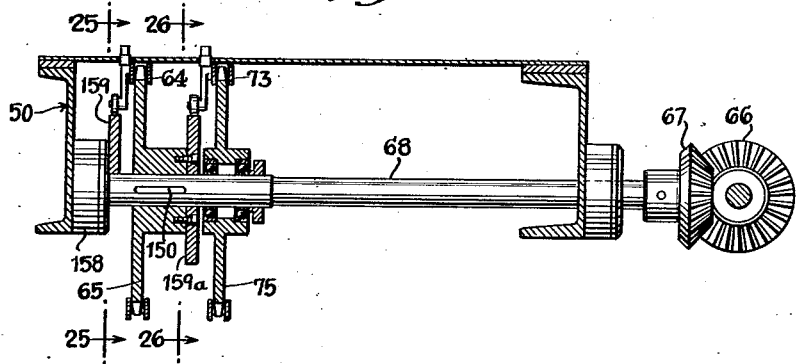
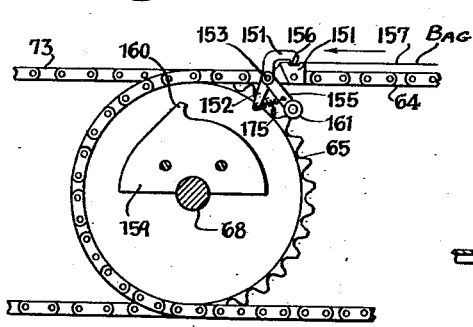
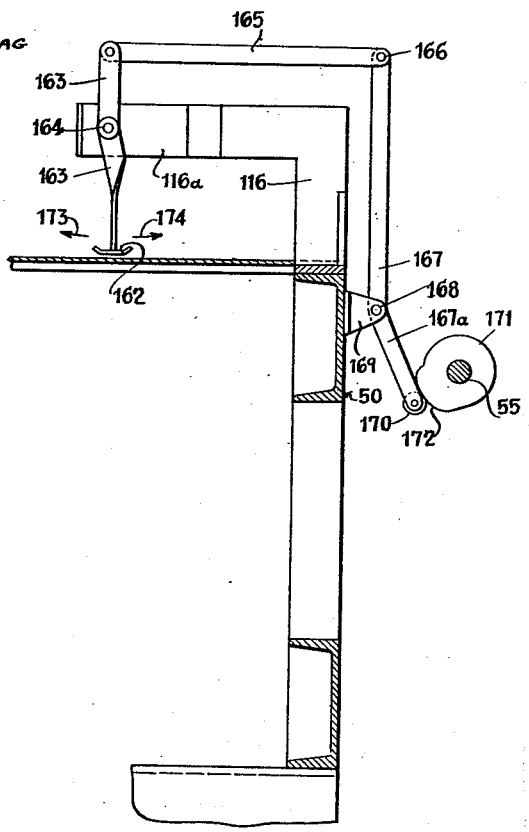
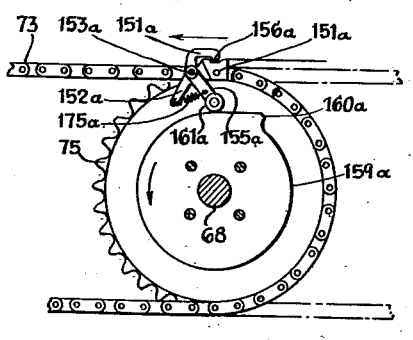
INVENTORS.
WILHELM SELTMANN
GÜNTHER CLAUS.

United States Patent Office 2,810,328
Patented Oct. 22, 1957

2,810,328

METHOD AND APPARATUS FOR MANUFACTURING PAPER BAGS

Wilhelm Seltmann and Günther Claus, Oker, Germany, assignors to Natronzellstoff- und Papierfabriken Aktiengesellschaft, Mannheim-Waldorf, Germany, a corporation of Germany Application December 24, 1954, Serial No. 477,438

Claims priority, application Germany December 28, 1953

9 Claims. (Cl. 93—22)

This invention relates to the manufacture of paper bags and more particularly to methods and apparatus for forming the end closures of pasted end type bags of the forms hereinafter described.

The more common forms of pasted bag end closures comprise inturned corner flaps so-called, over which a pair of so-called overlying side flaps are folded down, with the end portions of such side flaps pasted to the outer surfaces of the corner flaps. However, in another form of pasted end bag which has been used in some countries, the corner flaps are so folded and merged with the ends of the side flaps as to form triangular protruding portions which will be hereinafter referred to as "corner tabs." Bags of this general type are shown in U. S. patent to Robinson No. 2,073,222, granted March 9, 1937, and in which corner tabs of this type are illustrated for example in Figs. 10 and 16. After such triangular corner tabs are formed and the side flaps are pasted down, these corner tabs may, if desired, be folded down onto and pasted to the side flaps. This construction will then provide a bag bottom having exceptionally strong end corner portions which, if made properly, are quite siftproof. Also, such corners may be made with exceptionally efficient utilization of the paper areas required for forming the end closure flaps. That is, generally the four flaps required for one end closure may be made with less total paper area than the more common types of pasted end bags require if the closure is to be of adequate strength and free of leakage possibilities.

However, the methods and machinery heretofore used for making such bag closures with these triangular corner tabs has been very complicated and has not permitted the rapid production of such bags in continuous operation without substantial numbers of imperfect and rejected bags from time to time. Accordingly, despite the advantageous features of this type of bag, the difficulties of manufacturing same economically at high speed has discouraged more wide-spread use thereof.

In accordance with the present invention, however, a method and apparatus is provided for manufacturing bags with such corner tabs with dependable accurate shaping and folding of the various parts of the closure flaps at high speed and yet with apparatus of a relatively simple construction.

The invention is well adapted for making multiwall bags either with stepped end flaps similar to those disclosed in said Robinson patent, or with single ply or multiply walls which are non-stepped, as hereinafter disclosed for simplicity and by way of example.

Other objects, features and advantages of the invention will appear from the more detailed description given below, taken in connection with the accompanying drawings which form a part of this specification.

In the drawings:

Figs. 1–9 inclusive show end closure portions of a bag, each figure illustrating one of the successive steps in carrying out the method of the invention;

Fig. 10 is a perspective view showing approximately the positions of various portions of the flaps at one corner during one of the stages of the method;

Fig. 11 is an elevational view of a preferred form of machine for carrying out certain of the steps;

Fig. 13 is a side view showing details of certain operating mechanism including a periodically operating conveyor device;

Fig. 14 is a plan view of the parts shown in Fig. 13;

Fig. 15 is a side view showing certain of the details of Fig. 14;

Fig. 16 is a cross-sectional view taken substantially along line 16—16 of Fig. 15;

Fig. 17 is a perspective view of the parts shown in Figs. 15 and 16;

Figure 12:
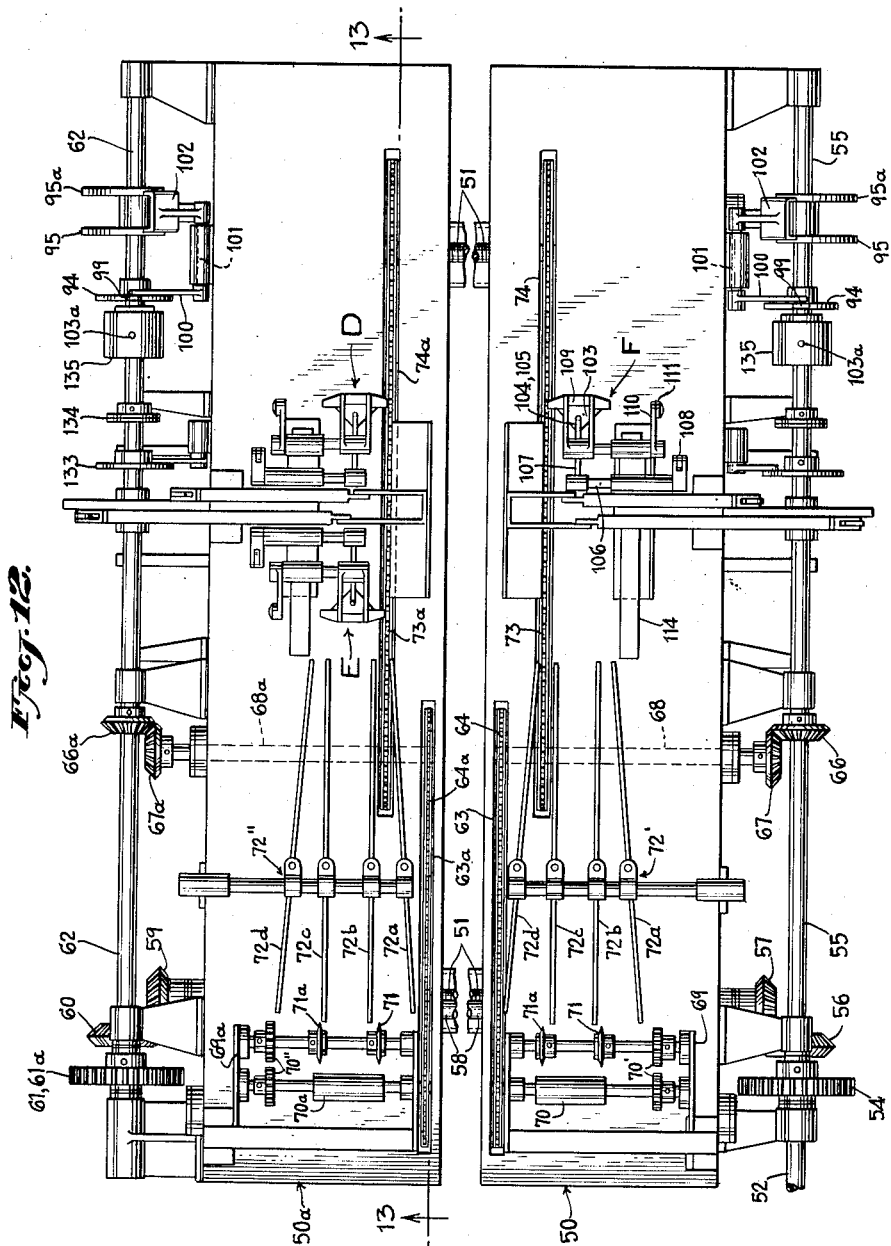
Fig. 12 is a plan view of the machine of Fig. 11.

Figs. 18, 19 and 20 respectively are side views showing certain mechanism in three different positions of operation for forming the corner tabs;

Fig. 21 is a side view of certain forwarding mechanism of the apparatus;

Figs. 22 and 23 respectively are perspective views showing in two different positions of operation certain of the parts of such forwarding mechanism;

Fig. 24 is a cross-sectional view somewhat enlarged, taken substantially along line 24—24 of Fig. 14;

Figs. 25 and 26 respectively are cross-sectional views taken substantially along lines 25—25 and 26—26 of Fig. 24; and Fig. 27 is a side view of certain mechanism for preventing the bag side flaps from rising after they have been folded down.

Referring now to Fig. 1, there is here shown an end portion of a multiwall bag tube length ready to have the bottom closure flaps formed thereon. While all of Figs. 1–10 show the bottom end of a bag in various stages during the formation of a bottom closure, such as for an open mouth bag, it will be understood that similar steps may be taken in forming the top closure in the case of valve bags, except that at the valve corner, the corner flap will be left folded inwardly in conventional manner to form a valve flap, instead of being formed with one of the so-called corner tabs.

As shown in Fig. 1, portions as at 25 are first cut from each corner of the flattened tube end to remove paper areas which, as will hereinafter be apparent, would otherwise project objectionably at the apices of the finished triangular corner tabs or interfere with the proper formation thereof. Preferably these corner cut-outs or notches may be made along somewhat curved lines as shown and on one or more of the inner plies same may be made more extensive, as indicated by the dotted lines in Figs. 1 and 2.

Next, as shown in Fig. 2, portions of the bag end which are to form side flaps at 26, 27 are spread apart and corner flap areas 28 and 29 are pulled in, according to common well-known practice, for forming corner flaps joined to side flap areas.

Then preferably glue is applied to various areas as shown in Fig. 3. That is, a line of adhesive 30 is applied on what is to be the under surface of the overlying side flap 26 for pasting this side flap onto the outer surface of the underlying side flap 27. And on each corner flap, two generally triangular glue areas as at 31, 32 are applied, these areas eventually being positioned on the underside of the corner tabs when eventually formed, and serving to secure such corner tabs down onto the overlying side flaps when finally in position. Also, on each corner flap a glue area 33 is provided, which, in the final construction, will serve to adhere together what will eventually be end portions of the side flaps. That is, lines of adhesive 33 will then supplement and in effect extend the length of the line of adhesive 30.

Next, as shown in Fig. 4, the lines of juncture between the side and corner flaps may be defined by creasing the bag end along base fold lines as indicated at 34, 35. The folding and creasing steps thus far described may, of course, be performed manually as is the case with the remaining operations about to be described, but for rapid production of the bags in large numbers, the operations thus far described may be performed on well-known bag bottoming equipment in the conventional way, while the remaining operations are performed automatically on the machine hereinafter described.

As shown in Fig. 5, the side flaps 26, 27 are next raised by flexing same about the base fold lines 34, 35, into vertical positions relative to the remainder of the bag bottom portion, while the corner flaps 28, 29 remain down in their former positions. Next the inner portions of the corner flaps are raised to vertical positions as shown in Fig. 6. This involves creasing the corner flaps along lines as indicated at 36 (Figs. 6 and 7) and thus at about this time each total corner flap area will become divided and be comprised of triangular areas as at 28', 29' which remain flat, vertical triangular areas as at 37 (see Fig. 7), and two other generally triangular areas as at 38, 39 (which bear the adhesive areas 32 and 31 respectively). At the same time, there will be two further triangular areas as at 40, 41 and which will eventually form end portions of the side flaps.

Now while the triangular flap portions 37 remain in upstanding vertical position as shown in Fig. 7, the underlying side flap 27 is folded down and the overlying side flap 26 is folded down thereon. At this time, corner flap portion 38 is brought into partially overlapping relation to flap portion 39, bringing both into vertical position flatwise against the inner surface of corner flap portion 37, thus forming the triangular corner tabs above referred to and as same appear in Fig. 7. Then, if pressure is applied to form a crease along lines as at 42 at the inside of the base of these corner tabs and so as to longitudinally stretch the side flaps, the side flaps which include at their ends the portions 40 and 41 may be pasted down firmly in flat condition notwithstanding the creases thereon which were previously made at lines 43 and 44.

The upstanding or protruding triangular corner tabs may, if desired, now be left in protruding position as shown in Fig. 7, but generally it will be preferred to fold them down flatwise onto the side flaps 26, 27 as shown in Fig. 8 and same will remain adhered to the exposed portions of the side flaps by reason of a portion of the adhesive area 31 and the adhesive area 32. Or glue for this purpose may be applied just before the corner tabs are folded down.

The bags may then move on to conventional apparatus for adhering thereto, if desired, bottoming or so-called label strips as at 45 (Fig. 9).

The above-described sequence of steps for forming the type of bag closures in question has not heretofore been followed, particularly the steps as described in connection with Figs. 5–7, and neither has apparatus suitable for performing the method heretofore been devised, except for steps such as of Figs. 2–4 inclusive.

Now in order to carry out the method automatically, the bag ends are first put through any suitable known form of bag bottoming mechanism which will form the flaps as of Fig. 2 and apply the glue areas thereto as of Fig. 3. Such known mechanism is not shown in the drawings but may be positioned at the left hand end of the apparatus here shown in Figs. 11 and 12. In the equipment which precedes the apparatus of Figs. 11 and 12, the bag tube lengths may be advanced either longitudinally or at right angles to the direction of movement thereof, and if same travel at right angles to the direction of movement, the base fold lines, as indicated at 34 and 35 in Fig. 4, may also be formed in such preceding apparatus. If the bag blanks in the preceding machinery travel longitudinally of the path of travel, means should be provided to turn them through 90° so that they enter the apparatus of Figs. 11 and 12, now about to be described, in positions resting at right angles to the path of travel.

The machine as shown in Figs. 11–14 may comprise a unitary table as at 50 or a pair of side-by-side machine tables 50, 50a, in case both ends of the bag blanks are to be closed. The machine tables 50, 50a may be adjusted to varying distances apart as by a hand wheel 51a (Fig. 11) connected by any suitable gearing (not shown) to spindles 51 (Fig. 12) whereby the two machine tables may be variably spaced apart to operate on bags of different lengths.

The machines of Figs. 11 and 12 may be driven as by a shaft 52 extending from a suitable source of power or from the preceding mechanism which forms the flaps as per Fig. 2. From shaft 52 the drive is transmitted via gears 53, 54 to main shaft 55, which extends along the entire length of the machine to actuate the various devices on the tables 50, 50a. The drive is transmitted from shaft 52 via beveled gears 56, 57 to a transverse shaft 58 to machine table 50a, that is, via beveled gears 59 and 60 (Fig. 12) which drive the main shaft 62 for table 50a through gears at 61, 61a.

On each table 50, 50a slots 63, 63a are provided at which conveyor chains 64, 64a are located, which chains are provided with suitable detents, grippers or the like of any suitable known construction and spaced apart along their length for advancing the bag tube lengths. These chains may be conducted for example over sprockets as shown at 65, 65a (Fig. 14), sprocket 65 being keyed to a shaft 68 which drives chain 64, shaft 68 in turn being driven by beveled gears 66, 67 from shaft 55. Similarly, the corresponding chain on table 50a is driven by shaft 68a from beveled gears 66a, 67a from shaft 62 (Fig. 12).

These gripper chains 64, 64a in the machine as shown, first convey the bag tube lengths which have been preformed with flaps as per Figs. 2 and 3 into scoring or creasing devices to form the base fold line creases 34, 35 as shown in Fig. 4. For this purpose, pressure rolls 70, 70a followed by scoring wheels 71, 71a are provided and rotatably supported on suitable shafts as by bearings at 69, 69a. These shafts may be driven by gears 70', 70'' thereon if desired by any suitable further gearing which for clearness is not shown in the drawings.

Such scoring devices are followed by means for raising the side flaps 26, 27 from their positions shown in Fig. 4 to their vertical positions as shown in Fig. 5. For this purpose guide plates, rails or the like are provided as shown at 72a to 72d inclusive. These guides, as shown in Figs. 11 and 12, may be adjustably supported on suitable supporting structure 72', 72'' and preferably 72a and 72d are positioned so that they will slant upwardly somewhat, in the direction of the advance of the bag blanks. It will be noted that each adjacent pair of these guides is positioned to be located at opposite sides of each side flap, the rails 72b, 72c being parallel to the path of travel of the inside of the flaps, whereas the rails 72a and 72d (Fig. 12) are positioned at slight angles so as to gradually press the outside of the flaps respectively against the rails 72b, 72c as the flaps advance and are raised into vertical positions.

Approximately at the location of the shafts 68, 68a the bag lengths are released from the conveyor chains 64, 64a and transferred to gripper chain conveyor means 73, 73a which are located along slots 74, 74a in the machine tables. That is, shortly before the meeting point of the two sets of chains, mechanism, which will hereinafter be more fully described, is provided for opening the grippers on chains 64, 64a in order to turn the bag blanks over to the grippers on chains 73, 73a whereupon the grippers on the latter chains close and move the bag blanks on further. While the gripper chains 64, 64a are preferably advanced continuously, the chains 73, 73a, in accordance with the preferred embodiment of the invention, are moved forward periodically so that the operations illustrated in Figs. 6-8 may be carried out when the bag blanks are at rest.

After these operations have been concluded, the chains 73, 73a move again to convey the finished bag either to a desired point of delivery or to an apparatus of known type for applying a bottoming or label strip, as at 45 in Fig. 9, while at the same time the succeeding bag blank is advanced into position for carrying out the operations as per Figs. 6-8.

Reference will now be had to Figs. 13 and 14 as to the mechanism for periodically advancing the chain 73, it being understood that like mechanism is provided for chain 73a. The chain 73, it will be noted, is conducted along table 50 via sprocket wheels 75, 76. Sprocket wheel 75 turns freely on shaft 68. The drive of this chain 73 is effected through a chain of mechanism starting from gear 77, which is mounted on shaft 58. Gear 77 drives gear 78 which turns a crank 79 in the direction indicated by the arrow. A push rod 80 is pivotally connected to crank 79 and in turn operates a rocker arm 81 which is pivoted at its lower end 81'. A compensating lever 82 is pivoted at one end to the upper end of lever 81 and near its other end to a carriage 83. A chain driving lever 84 is arranged on this carriage and pivoted thereon at 85. The chain 73 is provided on one side thereof with four equally spaced pins as at 86 which are adapted to engage in a recess 87 formed at the upper end of lever 84. Projections 88 and 89 are located at each side of the recess 87. The lever 84 is normally held against a stop 90 on the carriage 83 by a spring 91. The carriage is slidably movable on a shaft 92. A shaft 93, on which sprocket 76 is mounted, extends (as shown in Fig. 14) from under the table to the outside thereof. The operation of the periodic conveyor mechanism above described is as follows.

Shaft 58 has a uniform rotary motion and upon rotation of the crank 79 counterclockwise through 180°, the lever 81 is swung forward from the left hand position shown by the dotted line, in the direction of the arrow A, into the position shown in full lines. During this movement, the gripper chain 73 is advanced one stroke in the direction of the arrow C. Upon the return of the rocker lever 81 from the position shown in full lines, chain 73 is locked for example by mechanism hereinafter described for holding the sprocket wheel shaft 93 against rotation. With the chain thus locked in position, the lever 84 disengages from one of the pins 86 (viz. pin 86' with the parts as in Fig. 13) and lever 82 pushes the carriage 83 toward the left, independently of chain 73. Thus the carriage 83 moves freely from the full line position shown in Fig. 13 into the left hand position shown by dotted lines, whereupon the projection 89 engages one of the pins on the chain (for example the one marked 86") and as the lever 84 is thereby momentarily tilted, its slot 87 will come into engagement with the pin.

Upon the next advance stroke, the carriage 83 will accordingly advance the gripper chain 73 along by means of pin 86" until the latter takes the position of the pin shown at 86'. The spacings of the four pins 86 etc. on the chain are made such that for a half revolution of shaft 58, shaft 93 will be turned through a full revolution. During one-half revolution of shaft 58, the advance stroke takes place; while during its second half revolution, motion of the shaft 93 is prevented by conveyor lock means now to be described in reference to Fig. 15-17. Such conveyor locking means are located in each case on the outer sides of the two tables 50, 50a.

For controlling the locking means, disc-like cams 94 are mounted to rotate on shafts 55 and 62 respectively, as are also locking members consisting of sector shaped parts 95, 95a which each extend over approximately an angle of 120°. On the shaft 93 on which is fixed the sprocket 76 for chain 73, there is fixed a bushing 96 formed with a lever portion 97 having a roller 98 positioned and adapted to rotate between the sector members 95, 95a. The cam 94 engages a follower in the form of a roller 99 carried by a lever 100 which is connected by a shaft 101 with a locking fork 102, whereby such fork is movable up and down above the axis of shaft 93 and above the sector members.

In the operation of this locking means, assuming that the chain 73 starts to move forwardly so as to rotate shaft 93 and its bushing 96, this will cause lever portion 97 and the roller 98 thereon to revolve about the axis of shaft 93 and to make one full revolution during the forward movement of the chain. Thereupon the roller 98 enters between the sector members 95, 95a which are being driven continuously by shaft 55 (or 62) counterclockwise (Fig. 16). The chain 73 and the shaft 93 will thereupon become locked against movement. Shaft 55 together with the sector members 95, 95a then continue to turn and the roller 98 turns between same. Shortly before emergence of the roller from between the locking segments, the locking fork 102 comes down into position about the roller 98. Thereafter, depending upon the shape of the cam 94 and the consequent timing of the movement of its follower 99, the locking fork will be raised into the position shown in Fig. 7, thereby releasing the roller 98 and the shaft 93, permitting the next forward movement of the chain 73.

In lieu of the above-described mechanism for periodically advancing the chains 73, 73a, it will be understood that other suitable well-known types of mechanism might be used such as Maltese cross transmissions, particularly if same are so constructed as to operate without disruptive impacts.

When the chains 73, 73a are stopped, the above-mentioned bag flaps and corner tabs are folded by means of devices located approximately over the mid-portion of these chains on the tables 50, 50a. One of the mechanisms for folding in a corner flap is shown in three different positions of operation in Figs. 18-20 inclusive and consists of a vacuum cup 103 with hose connection 103a which cup is pivotally supported via a curved lever 104 and at a pivot 105a to a rocker lever 105. This latter lever is connected to a shaft 106 (which is mounted on a fixed axis) and which is rotatable by means of a shift lever 107 and a connecting lever or rod 108 attached thereto. The vacuum cup 103 is furthermore pivoted with respect to a pressing lever 109 which can be actuated via a lever 110 pivotally connected to a connecting rod or lever 111. The connecting rods 108 and 111 as shown near the mid-portion of Fig. 11 extend down and under the surface of the tables and are actuated from cams 133 and 134, which cams are fixed upon and are rotated by shaft 55. These cams may have suitable followers which actuate levers (suitably attached to the rods 108, 111), for example levers 131, 132 (Fig. 1) mounted upon a shaft 130. (The construction of the parts actuating connecting rods 108 and 111 by the cams 133, 134 are only somewhat schematically indicated in Fig. 11. The details thereof are not important and may be altered in various ways.)

The mechanism which is shown in three different positions of operation in Figs. 18-20, is located on a supporting arm 112 carried on a post 113 above the surface of the tables. One of these mechanisms is provided for folding in each corner flap. However, if a valve bag is being made, the valve corner flap is folded in in the usual normal way and, if desired, in connection with the insertion of a valve sleeve in a known way. In that case, the mechanism as of Fig. 18 is dispensed with for the valve corner. In the case of the bag bottom, where closure flaps with the corner tags are to be made on both bottom corners, mechanism like that of Fig. 18, but facing in the opposite direction, is mounted on an extension 114 of the supporting arm 112, and in order to make possible adjustments to accommodate different bag bottom lengths (different bag widths) a slot as at 115 is provided on arm 114 along which various parts of mechanism like that above-described may be adjusted.

As shown in Fig. 12, above table 50a one of the mechanisms as of Fig. 18 is shown at D, mounted in forwardly directed position for forming one bottom corner of the bags and a like mechanism (but directed rearwardly) is shown at E for forming the other bottom corner of the bag, and on table 50, one of these mechanisms is shown at F for forming the top corner on the bag opposite from the valve corner.

The operation of the mechanism of Figs. 18–20 will now be described. With the bag flaps in the positions shown in Fig. 5, the pressure member 109 is brought down against area 29' of the bag corner flap and the vacuum cup 103 comes against a corner tab area such as indicated at 37 in Fig. 7. The hose connection 103a is then connected to a suction line or conduit 136 through any suitable automatic rotary valve 135 carried on or controlled by shaft 55 or 62 (see Figs. 11 and 12). Then when the vacuum cup is moved up to vertical position (as shown in Fig. 19) by the action of connecting rod 108, this corner tab area 37 is raised vertically. The edge of the pressure member 109 will crease the bottom edge of the area 37 with respect to area 28' about the line 36 (see Fig. 7). When the tab area 37 is in this vertical position, a spring member 104a (see Figs. 18–20) may be advantageously arranged on the lower end of lever 105 so as to come into the position indicated in Fig. 19, to hold the corner tab area 37 in upright position, even after removal of the suction from the cup 103, by pressing against the inside surface thereof. The spring member 104a may be for example in the form of a wire positioned to pass into the cutout areas such as at 25 as indicated in Figs. 1 and 2, and so as to still allow the flap areas as at 38, 39 to assume the positions shown in Fig. 6.

The pressing member 109 and suction cup are now withdrawn to the positions shown in Fig. 20.

The raising of the corner tab area 37 is followed by the folding in of the side flaps 26 and 27. This is done with mechanism shown in Fig. 21. This may be mounted on a supporting stand 116 carrying two rocker levers 117, 117a having plates 118, 118a at their lower ends of suitable shape and size to conform to the side flaps of the bag being bottomed. These rocker arms are operated by links 119, 119a, adjustable push rods 120, 120a and levers 121, 121a. The latter levers are pivotally mounted as at 122, 122a at the lower part of the machine. Between the two levers 121, 121a there is a spring 123 normally tending to pull them toward each other. A control disc 124 is fixed upon the main machine shaft 55 of table 50 (or shaft 62 in the case of table 50a) and on this disc are arranged two knobs or the like 125, 125a adjustably positioned in arcuate slots as shown so that when the shaft 55 rotates, the levers 121, 121a are thrust apart in the directions indicated by the arrows 126, 126a. This occurs once during each revolution of the shaft 55 and causes the shaping plates 118, 118a to move inwardly and thereby folding in the bag side flaps 26, 27 (which are indicated by dotted lines in Fig. 21). That is, these flaps are moved inwardly and downwardly in the directions indicated by the arrows, the underlying side flap 27 being moved downwardly somewhat in advance of the overlying side flap 26.

After the folding in of the side flaps, the raised corner tab areas as at 37 (Fig. 7) are now pushed downwardly by suitable positively operated pressing devices, onto the side flaps 26 and 27. For example, the operation of the suction cups 103 may be so timed that they will now be shifted to their downward positions again and then connected with a supply of compressed air instead of a vacuum connection so that they will be readily releasable from the corner tabs upon being raised again. For this purpose the conduits 103a to the suction cups may be connected by valves 135 to a source of compressed air through conduit 137 (Fig. 11) in place of the suction connection 136.

In order to stretch the side flaps 26, 27 at the same time that same are folded down by the plates 118, 118a to thereupon obtain sharp folds at the insides of the still vertical corner tabs, the plate 118 may be provided with so-called oblique folding devices for performing this stretching and smoothing operation. One form of such devices is shown in Figs. 22 and 23. Fig. 22 shows the position of the parts when the folding plate 118 is in its retracted position and Fig. 23 shows the condition of the parts as the folding plate is brought down against the overlying side flap of the bag. It will be understood that mechanism such as shown in these Figs. 22 and 23 is provided at each end of the folding plate 118. As shown, the end of the folding plate 118 is formed with an upwardly and inwardly inclined projection or the like 138 on which is pivotally mounted a plate element 139 secured in place by a pivoting pin 140. An arm 141 on the member 139 may be connected to any suitable means for turning the member 139 about the pin 140 when the folding plate 118 is pressed down. For example, the arm 141 may be connected by a chain 142 guided by a sprocket wheel 143 to a pin 144 carried by a retaining arm 145. The latter, for instance, may be fastened to some stationary part of the machine such as the supporting arm 112 above referred to. Upon the swinging of the folding plate 118, the member 139 will at the same time be rotated by pin 140 in the direction indicated by the arrow and to the position shown in Fig. 23, preferably at or just before the time of the final pressing down of the bag side flaps, at which time the edge 146 of member 139 will be moved around so that it will engage along a crease line such as at 42 (Fig. 7) that is, along the inside bottom edge of one of the bag corner tabs. A spring 140a surrounding the pin 140 may be suitably connected to the parts to cause return movement of the member 139 when the folding plate 118 again swings upwardly. If desired, also the member 139 may be formed with a portion 147 extending upwardly and rearwardly from the edge 146 to engage the inner surfaces of the bag corner tabs.

In order to prevent the side flaps 26, 27 from rising again after they have been folded down by the shaping plates 118, 118a, suitable mechanism, provided with a so-called holding down means, may be provided as shown in Fig. 27, part of which appears in Fig. 21. Such holding down means may consist of a plate 162, the longitudinal sides of which are bent upwardly, such plate extending longitudinally of the direction of the side flaps 26, 27. Said plate 162 is mounted on an arm 163 which is pivoted at 164 on the supporting frame 116 (or 116a). A lever 165 is pivotally connected to lever 163 at one end and pivotally connected at 166 at its other end to a bell crank lever 167, 167a, which in turn is pivotally mounted at 168 on a bracket 169 affixed to the machine table 50. The lower end of the bell crank arm 167a is provided with a cam follower in the form of a roll 170 which is engaged by a disc 171 affixed to shaft 55. As disc 171 rotates, the arm 167a will be moved to the left by reason of the engagement of cam surface 172 on disc 171 with the cam follower 170. This will cause the plate 162 to swing in the direction of the arrow 173. When the cam follower rotates over the remaining part of the disc 171, it is apparent that the plate 162 will be caused to swing in the direction of the arrow 174. During these movements, as indicated by the arrows 173, 174, the plate 162 swings over the folded down side flaps 26, 27 without interfering with their being folded down, but so as to prevent them from rising again after they have been folded down.

As above mentioned, mechanism is provided for opening the grippers on chains 64, 64a in order to deliver the bag blanks to the grippers on chains 73, 73a. Such mechanism will now be described in connection with Figs. 24 to 26 inclusive. Sprocket 65 for the conveyor chain 64 is keyed in fixed position on shaft 68 as by a cotter pin 150. This sprocket is driven continuously. Gripper members such as shown at 151 are located on conveyor chain 64 at fixed intervals in accordance with the size of the bag blanks and these members at their lower sides are formed with lever portions as at 152. A bell crank type of lever means having arms 154, 155 may be pivoted as at 153 on the gripper member 151. The bag blanks as at 157 may be clamped and fixed between the upper surface of gripper 151 and an end portion 156 of arm 154. The grippers on chain 64a will have the same mechanism. A spring 175 is connected between lever arms 152 and 155.

The sprocket wheel 75 for chain 73 may be mounted to turn freely on shaft 68, the chain 73 being also provided with grippers like those above described with parts as at 151–156 inclusive, such parts being illustrated in Fig. 26 by the same reference numerals accompanied by the letter a.

A disc 159 having a cam portion 160 may be secured in fixed position for example on the bearing 158 for shaft 68. One end of the gripper arm 155 is provided with a cam follower roll 161 which is adapted to be engaged by the cam surface 160 (Fig. 25). A disc 159a may be fixed upon the constantly rotating sprocket 65. The end of the gripper lever 155a has a cam follower roll 161a adapted to engage the edge of the disc 159a. A cam area 160a is adapted to move the cam follower 161a upwardly once during each revolution of the sprocket 65.

The mechanism of Figs. 24–26 operates as follows. By reason of the continuous movement of the gripper chains 64, the bag blanks are forwarded. When the cam follower 161 is engaged by the cam area 160, the gripper arms 154, 155 are turned about pivot 153 and the portion 156 of arm 154 is lifted. Thereby the bag blank is released at a point near the vertical plane which passes through the axis of shaft 68. At that moment, the disc 159a which is fixed on sprocket 65 will be moving into a position whereby cam area 160a will come into engagement with cam follower 161a, thereby also opening the grippers on chain 73. The bag blanks now released from chain 64 will have reached a position between the gripper parts 151a and 156a. While the sprocket wheel 65 is moving together with disc 159a, the cam area 160a will pass the came follower 161a, then allowing the gripper arm 154a to fall in engagement with the bag blank and clamping same against gripper part 151a. Then the bag blank may be advanced by the periodic movement of the conveyor chain 73 as described in connection with Figs. 14 and 16.

We claim:

1. Method for forming a bag closure having side flaps and corner flaps and outer corner tabs integrally formed of the adjoining side and corner flap areas, which method comprises the steps of first spreading apart flatwise the end areas of the bag which are to form the side flaps and with the areas which are to form the corner flaps folded in flatwise onto the end portions of the side flap areas; creasing the bag end along lines respectively which are to form the base fold lines of the side flaps; folding the side flaps about said lines to raise same into upstanding position; raising the inner portions of the corner flap areas into upstanding position by folding each upwardly and outwardly about a line transverse to the ends of the side flaps, while the outermost areas of the corners remain flattened; and then folding the underlying and overlying side flaps respectively inwardly and downwardly about their base fold lines into overlying relationship and leaving said inner portions of the corner flap areas upstanding to form said corner tabs, and finally folding such corner tabs inwardly and downwardly onto the overlying end portions of the side flaps.

2. Method in accordance with claim 1 and in which the side flaps, while being folded inwardly and downwardly, are spread longitudinally so that the end portions respectively thereof are flattened and are transversely creased to terminate along lines at the bases of the inside surfaces of the upstanding corner tabs.

3. In apparatus for forming a bag closure having side flaps and corner flaps and outer corner tabs integrally formed of the adjoining side and corner flap areas, said apparatus being adapted to receive bag blanks after the areas thereof which are to form the side flaps are spread apart flatwise and with the areas which are to form the corner flaps folded in flatwise onto the end portions of the side flap areas, the combination comprising: means for advancing the bag lengths in positions to extend transversely of the path of movement; means for creasing the bag end along lines respectively which are to form the base fold lines of the side flaps; means for then folding the side flaps about said lines to raise same into upstanding positions as the bag blank advances; means for then raising the inner portions of the corner flap areas into upstanding position by folding each upwardly and outwardly of the bag end about a line transverse to the ends of the side flaps; means for meanwhile retaining the outermost areas of the corners in flatwise condition; and means for then folding the underlying and overlying side flaps respectively inwardly and downwardly about their base fold lines into overlying relationship while the said inner portions of the corner flap areas remain upstanding to form said corner tabs.

4. In apparatus for forming a bag closure having side flaps and corner flaps and outer corner tabs integrally formed of the adjoining side and corner flap areas, said apparatus being adapted to receive bag blanks after the areas thereof which are to form the side flaps are spread apart flatwise and with the areas which are to form the corner flaps folded in flatwise onto the end portions of the side flap areas, the combination comprising: means for advancing the bag lengths in positions to extend transversely of the path of movement; means for then folding the side flaps about their fase fold lines to raise same into upstanding positions as the bag blank advances; means for then raising the inner portions of the corner flap areas into upstanding position by folding each upwardly and outwardly of the bag end about a line transverse to the ends of the side flaps; means for meanwhile retaining the outermost areas of the corners in flatwise condition; pivotally mounted plate means for then folding the underlying and overlying side flaps respectively inwardly and downwardly about their base fold lines into overlying relationship while the said inner portions of the corner flap remain upstanding to form said corner tabs.

5. Apparatus in accordance with the foregoing claim 3 and in which the means for raising the inner portions of the corner flap areas into upstanding position comprise pivotally mounted suction cup means; and mechanism for moving same to position the face thereof upright or alternatively generally horizontally down against a bag flap.

6. Apparatus in accordance with the foregoing claim 3 and in which the means for raising the inner portions of the corner flap areas into upstanding position comprise pivotally mounted suction cup means; mechanism for moving same to position the face thereof upright or alternatively generally horizontally down against a bag flap; and mechanism for actuating said suction cup means to press the corner tabs, after being formed inwardly and downwardly against the overlying side flaps, and for then applying air pressure in lieu of suction to said cups.

7. Apparatus in accordance with the foregoing claim 3 and in which the means for retaining the outermost areas of the corners in flatwise condition comprise pivotally mounted pressure elements and the means for raising the inner portions of the corner flap areas comprise suction cups pivotally connected to said pressure elements and connected to linkage for shifting same to a generally upright or generally horizontal position.

8. Apparatus in accordance with the foregoing claim 3 and in which the means for raising the inner portions of the corner flap areas comprise suction cups and actuating mechanism connected thereto for alternatively raising same while applying suction thereto or for lowering same after said corner tabs have been formed, to press such tabs down against the overlying side flaps.

9. Apparatus in accordance with the foregoing claim 4 and in which means is pivotally mounted on each end of the plate means which folds down the overlying side flap, which pivotally mounted means are connected by mechanism to cause same to swing as the plate means is lowered against the side flap to positions for longitudinally smoothing out and creasing the overlying side flap at the juncture of its ends with the base portions of the corner tabs.

References Cited in the file of this patent
UNITED STATES PATENTS

| | | |
|---|---|---|
| 219,376 | Appel | Sept. 9, 1879 |
| 331,722 | Lorenz et al. | Dec. 1, 1885 |
| 388,613 | Appel | Aug. 28, 1888 |
| 619,262 | Appel | Feb. 14, 1899 |
| 692,695 | Mullen | Feb. 4, 1902 |
| 2,570,047 | Burroughs | Oct. 2, 1951 |